F. AND P. B. STREICH.
CONVEYER FOR PROOFING APPARATUS.
APPLICATION FILED DEC. 13, 1918.
1,322,647. Patented Nov. 25, 1919.
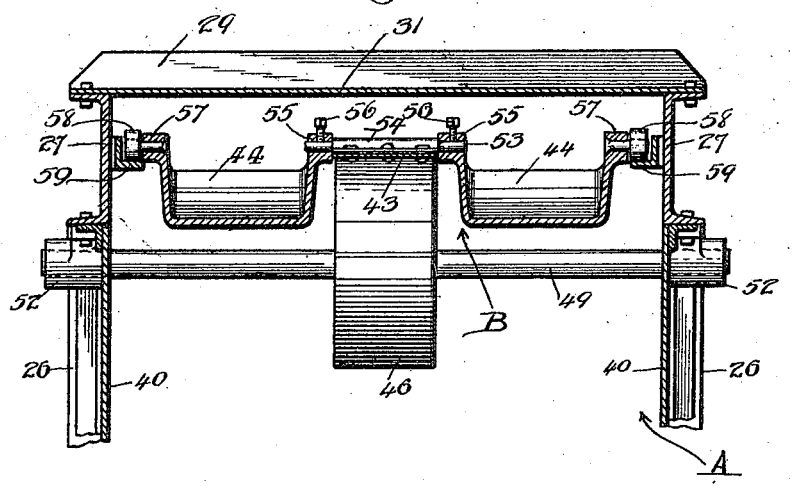
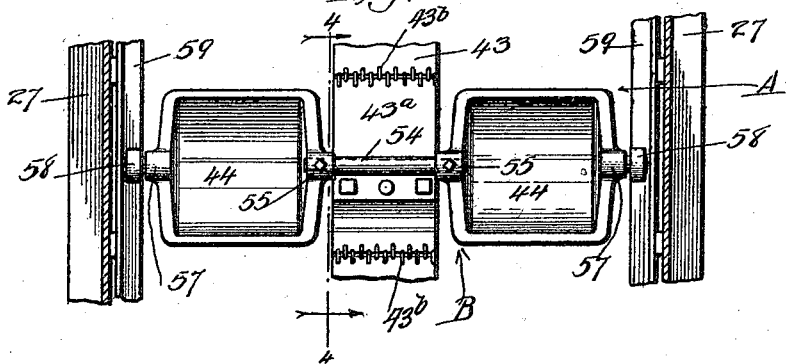
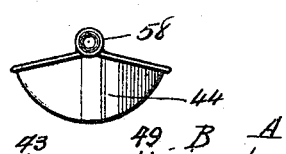 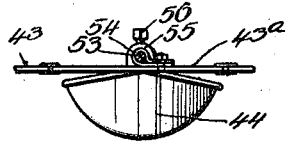
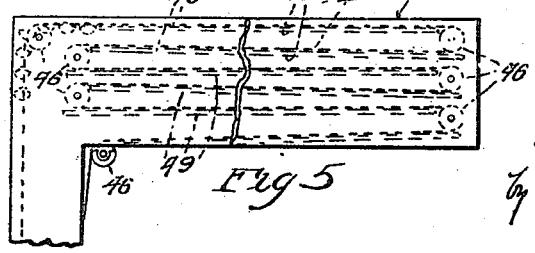
Inventors:
Frank Streich
and Paul B. Streich
by Charles O. Shurty
their Atty

UNITED STATES PATENT OFFICE.

FRANK STREICH AND PAUL B. STREICH, OF JOLIET, ILLINOIS, ASSIGNORS TO THE UNION WRAPPING MACHINE COMPANY, OF JOLIET, ILLINOIS, A CORPORATION OF ILLINOIS.

CONVEYER FOR PROOFING APPARATUS.

1,322,647.          Specification of Letters Patent.        Patented Nov. 25, 1919.

Original application filed August 13, 1918, Serial No. 249,646. Divided and this application filed December 13, 1918. Serial No. 266,548.

*To all whom it may concern:*

Be it known that we, FRANK STREICH and PAUL B. STREICH, citizens of the United States, and residents of Joliet, Will county, and State of Illinois, have invented certain new and useful Improvements in Conveyers for Proofing Apparatus, of which the following is declared to be a full, clear, and exact description.

This invention relates to proofing apparatus and more particularly to the conveyer which conveys the lumps of dough through the proofing chamber thereof. One form of proofing apparatus is shown and described in our prior application for patent, filed by us on August 13, 1918, Serial No. 249,646 from which this application has been divided.

Proofing apparatus of this character comprises an elongated proofing chamber in which travels an endless dough conveyer having buckets for receiving lumps of dough and conveying them through the chamber for a predetermined interval and thereafter discharging them therefrom to be subsequently acted upon by other means.

The present invention has for its main objects to increase the capacity of the conveyer and to simplify and otherwise improve upon the construction of conveyers of this class. With these and other objects in view, this invention consists in the several novel features hereinafter fully described and claimed.

The invention is clearly illustrated in the accompanying drawing, in which:

Figure 1, is a vertical, cross section through a proofing apparatus embodying a simple form of the present invention; Fig. 2, is a view partly in plan and partly in section of a conveyer and side walls of the proofing chamber; Fig. 3, is an end elevation of one of the conveyer buckets; Fig. 4, is a view partly in side elevation and partly in vertical, longitudinal section of a fragment of the conveyer, the line of section being indicated at line 4—4 in Fig. 2, and Fig. 5, is a diagrammatical view of a proofing chamber and conveyer.

Referring to said drawing, which illustrates a simple embodiment of the present invention, the reference character A, designates an elongated proofing chamber and B, designates the conveyer which travels through said elongated proofing chamber. As in our prior application, above referred to, the proofing chamber may comprise upright frame members 26, horizontal, lengthwise extending frame members 27, secured thereto, vertical panels or walls 40, and top and bottom walls 31. The side walls may be connected by cross members 29, to strengthen and reinforce the structure.

The endless traveling conveyer B, comprises an endless belt 43, which is trained around a number of pulleys 46, mounted upon shafts 49, journaled in bearing boxes 52, supported by the framework of the proofing chamber. One or more of the shafts are driven by a suitable motor to travel at a low rate of speed. Connected with said endless belt 43, are the dough receiving buckets 44, which are arranged in pairs along the length of the conveyer belt 43, one bucket of each pair being disposed at one side of the belt and the other at the opposite side thereof. Each bucket is formed with oppositely disposed ears 55, 57, at the top of its side walls and the ears 55, of each pair of buckets are connected by a rod 53, which is secured in said ears 55, by set screws 56, threaded in said ears and bearing against the rods. Said rods 53, extend across the conveyer belt 43 and are rotatively secured thereto by clips 54, which are bolted, riveted or otherwise secured to said belt. In the ears 57, are secured short shafts upon which are journaled rollers 58, that travel upon tracks 59, secured to the framework of the proofing chamber.

Obviously, the conveyer belt may be of any suitable form of construction and it is here illustrated as comprising a flexible band, and to provide for taking up slack which occurs in belts of this character, short pieces 43$^a$, are provided at intervals in the band which short pieces are secured to the main portion of the band by belt fasteners 43$^b$, and said short pieces may be removed when the band stretches and the adjacent end portions of the band may be secured together by the belt fasteners.

It is to be observed that the buckets of each pair are rigidly fastened together, to provide a unitary, rigid structure, and are supported by the tracks 49, upon which the rollers 58 travel, and that the conveyer belt serves principally to move said buckets through the proofing chamber. The pivotal connection between the buckets and conveyer belt permits the buckets to remain in an upright position, although the belt travels around the pulleys, back and forth through the proofing chamber. Said pivotal connection also permits the buckets to be inverted by dumping mechanism (not shown, but shown and described in our prior application) for dumping the dough at the discharge end of the machine.

More or less variation of the exact details of construction is possible without departing from the spirit of this invention; we desire, therefore, not to limit ourselves to the exact form of the construction shown and described, but intend in the following claims, to point out all of the invention disclosed herein.

We claim as new and desire to secure by Letters Patent:—

1. In an apparatus of the class described, the combination with an elongated proofing chamber, oppositely disposed tracks therein, and pulleys mounted therein, of an endless traveling conveyer belt extending back and forth in said chamber and trained around said pulleys, bucket supports projecting from each side of the belt, clips pivotally connecting said bucket supports to said belt, and buckets connected to said supports and having projections traveling upon said tracks.

2. In an apparatus of the class described, the combination with an elongated proofing chamber, oppositely disposed tracks therein, and pulleys mounted therein, adjacent the ends of the tracks, of an endless traveling conveyer belt extending back and forth through said chamber and trained around said pulleys, buckets along each side of the belt and arranged in pairs, crosswise extending rods having end portions projecting beyond said belt, and clips pivotally connecting said rods with said belt, said buckets being rigidly secured to said rods and having rollers on their outer ends arranged to travel upon said tracks.

3. In an apparatus of the class described, the combination of an elongated proofing chamber, oppositely disposed tracks therein, and pulleys mounted therein adjacent the ends of the tracks, of an endless traveling conveyer belt extending back and forth through said chambers and trained around said pulleys, buckets along each side of the belt and arranged in pairs, and having rollers running upon said tracks, and crosswise extending rods on said belt forming pivoted connections between said buckets and belt.

FRANK STREICH.
PAUL B. STREICH.